(12) United States Patent
Van Assche et al.

(10) Patent No.: US 9,485,087 B2
(45) Date of Patent: Nov. 1, 2016

(54) METHOD AND CIRCUIT FOR CRYPTOGRAPHIC OPERATION

(75) Inventors: Gilles Van Assche, Woluwe-St-Lambert (BE); Joan Daemen, Overpelt (BE); Guido Bertoni, Carnate (IT)

(73) Assignees: Proton World International N.V., Diegem (BE); STMicroelectronics S.r.l., Agrate, Brianza ( * ) Notice: Subject to any disclaimer, the term of this patent is extended or adjusted under 35 U.S.C. 154(b) by 262 days.

(21) Appl. No.: 13/461,473

(22) Filed: May 1, 2012

(65) Prior Publication Data
US 2012/0284533 A1 Nov. 8, 2012

(30) Foreign Application Priority Data
May 5, 2011 (EP) .................................. 11164951

(51) Int. Cl.
 H04L 29/06 (2006.01)
 H04L 9/00 (2006.01)
 H04L 9/06 (2006.01)
(52) U.S. Cl.
 CPC ............... *H04L 9/002* (2013.01); *H04L 9/004* (2013.01); *H04L 9/06* (2013.01); *H04L 2209/12* (2013.01)
(58) Field of Classification Search
 USPC .................. 380/28, 30, 44; 713/168
 See application file for complete search history.

(56) References Cited

U.S. PATENT DOCUMENTS

| | | | | |
|---|---|---|---|---|
| 5,048,086 A * | 9/1991 | Bianco et al. | ................... | 380/28 |
| 5,982,900 A * | 11/1999 | Ebihara | ................... | G06F 7/728 380/30 |
| 6,125,182 A * | 9/2000 | Satterfield | ....................... | 380/28 |
| 6,298,135 B1 * | 10/2001 | Messerges | ............... | G06F 7/723 380/1 |
| 7,188,258 B1 * | 3/2007 | Aggarwal et al. | ............ | 713/194 |
| 7,200,225 B1 * | 4/2007 | Schroeppel | ..................... | 380/28 |
| 7,421,496 B2 * | 9/2008 | Motoyama | ................... | 709/224 |
| 7,580,472 B2 * | 8/2009 | Lablans | ................... | H04J 13/00 331/78 |
| 8,386,800 B2 * | 2/2013 | Kocher et al. | ................ | 713/189 |
| 2003/0120944 A1 * | 6/2003 | Kim | ......................... | G06F 7/72 713/193 |
| 2004/0078570 A1 * | 4/2004 | Geiringer | .............. | H04L 9/3093 713/165 |
| 2004/0083251 A1 * | 4/2004 | Geiringer | ................ | G06F 7/724 708/492 |
| 2004/0125950 A1 * | 7/2004 | Yen | ......................... | H04L 9/003 380/30 |
| 2005/0116740 A1 * | 6/2005 | Elbe | ..................... | G06F 13/4027 326/86 |
| 2005/0195975 A1 * | 9/2005 | Kawakita | ....................... | 380/30 |
| 2008/0140739 A1 * | 6/2008 | Elbe | ......................... | G06F 7/72 708/190 |
| 2008/0250244 A1 * | 10/2008 | Baentsch | ................. | H04L 9/088 713/168 |
| 2008/0260150 A1 * | 10/2008 | De Clercq | ..................... | 380/255 |
| 2009/0060202 A1 * | 3/2009 | Lablans | ............ | H04L 25/03866 380/287 |
| 2009/0067617 A1 * | 3/2009 | Trichina | ................... | G06F 7/723 380/28 |
| 2010/0067690 A1 * | 3/2010 | Han | ......................... | G06F 7/725 380/44 |

OTHER PUBLICATIONS

European Search Report dated Oct. 4, 2011 from corresponding European Application No. 11164951.
Menezes A J et al.; *Polyalphabetic Substitutions and Vigenere Ciphers (Historical)* Ed, Jan. 1, 1997, Handbook of Applied Cryptography; [CRC Press Series on Discrete Mathematices and ItsApplications], CRC Press Series on Discrete Mathematics and Its Applications, Boca Raton, FL, US, pp. 241-242, XP002216606.
Millikin D D: *Square Tables, Discs and Slide Rules. The Vigenere Chipher*, Elementary Cryptography and Cryptoanalysis, XX, XX, Jan. 1, 1943, pp. 88-90, XP002915474.
Donald E Knuth: *The Art of Computer Programming. Sorting and Searching*, Mar. 1, 1998, pp. 513-558, XP007919497.

* cited by examiner

*Primary Examiner* — Harris C Wang
(74) *Attorney, Agent, or Firm* — Seed IP Law Group PLLC (57) ABSTRACT

A method of performing a cryptographic operation including: receiving a plurality of binary input values; splitting the binary input values into a plurality of non-binary digits of base r, where r is an integer greater than 2 and not equal to a power of 2; and performing, by a cryptographic block on each of the plurality of non-binary digits, a different modulo r operation to generate at least one output digit) of base r.

34 Claims, 3 Drawing Sheets

METHOD AND CIRCUIT FOR CRYPTOGRAPHIC OPERATION

CROSS REFERENCE TO RELATED APPLICATIONS

This application claims the priority benefit of European patent application number 11164951.3, filed on May 5, 2011, entitled METHOD AND CIRCUIT FOR CRYPTOGRAPHIC OPERATION, which is hereby incorporated by reference to the maximum extent allowable by law.

BACKGROUND

1. Technical Field

Embodiments relate to a method and circuit for performing a cryptographic operation, and in particular to a method and circuit for performing a hardware implemented cryptographic operation.

2. Discussion of the Related Art

In order to fraudulently unlock the functionalities protected by a cryptographic access device, such as an IC (integrated circuit) card or the like, one technique often employed by fraudsters, after recovering the secret or private key associated with the IC card, is to clone the access device. The cryptographic operations performed by such access devices are generally implemented in dedicated hardware, rather than in software, which provides some protection against cloning by making it harder to recover the secret key from the chip. However, once the secret key is discovered, fraudsters may still be able to emulate the cryptographic operations in software executable by a general purpose processor.

Indeed, in the case of an IC card associated with the video decoder of a set-top box, a fraudster may obtain information regarding the encryption key stored on the card using side channel attacks such as DPA (differential power analysis) and/or fault injection involving for example sweeping the surface of the chip using a laser beam to change one or more bit values. Once a fraudster manages to discover the cryptographic key, the algorithms implemented by the IC card can be emulated in software running on a general purpose processor coupled in an appropriate manner to the set-top box.

There is a need for a cryptographic method and circuit that provides improved resistance to cloning. In particular, there is a need for a method and circuit that makes it more difficult to program and use a software emulation of a cryptographic access device.

SUMMARY

Embodiments at least partially address one or more needs in the prior art.

According to one aspect, there is provided a method of performing a cryptographic operation comprising: receiving a plurality of binary input values; splitting said binary input values into a plurality of non-binary digits of base r, where r is an integer greater than 2 and not equal to a power of 2; and performing, by a cryptographic block on each of the plurality of non-binary digits, a different modulo r operation to generate at least one output digit of base r.

According to one embodiment, the method further comprises extracting from said at least one output digit of base r a plurality of binary output values.

According to another embodiment, the method further comprises performing imbalance correction on the binary output values. For example, the imbalance correction is performed by generating each binary output value based on an XOR operation applied to at least two bits of said at least one output digit.

According to another embodiment, each operation of base r comprises a modular addition, subtraction and/or multiplication of said non-binary digit with at least one further non-binary digit, and/or taking the modular additive or multiplicative inverse.

According to another embodiment, r is a prime number not equal to 2.

According to another embodiment, r is equal to 2n−1, where n is an integer equal to or greater than 2.

According to another embodiment, the method further comprises generating an alert signal if the execution time of said cryptographic operation exceeds a set time limit.

According to another embodiment, the cryptographic operation is an iterative execution of a round function performed on a state of non-binary state digits, each execution of said round function being based on one or more of said plurality of non-binary digits. For example, the iterative round function comprises a different modulo r operation applied to each digit of said state.

According to another embodiment, said cryptographic operation comprises one of: a sponge function; a stream cipher; a compression function of a hash function; an iterated permutation; a block cipher; and a message authentication operation.

According to another embodiment, the method further comprises generating an alert if said plurality of bits has a combination that does not represent a digit of base r.

According to another embodiment, there is provided a method of slowing the execution time of a software implementation of a cryptographic operation comprising the above method.

According to another embodiment, there is provided a circuit for performing a cryptographic operation comprising: a first block adapted to split a plurality of binary input data values into a plurality of non-binary digits of base r, where r is an integer greater than 2 and not equal to a power of 2; and a cryptographic block adapted to perform on each of the plurality of non-binary digits, a different modulo r operation to generate at least one output digit of base r.

According to another embodiment, the circuit further comprises: a second block adapted to extract, from said at least one output digit of base r, a plurality of binary output values.

According to another embodiment, the second block is further adapted to perform imbalance correction on said binary output values. For example, the second block is adapted to perform the imbalance correction by generating each binary output value based on an XOR operation applied to at least two bits of said at least one output digit.

According to another embodiment, the cryptographic block is adapted to perform an iterative execution of a round function performed on a state of non-binary state digits, each execution of said round function being based on one or more of said plurality of non-binary digits. For example, the iterative round function of the cryptographic operation comprises a different modulo r operation applied to each digit of said state.

According to another embodiment, there is provided an IC card comprising the above circuit.

According to embodiment, there is provided a cryptographic access system comprising the above circuit; and a receptor device adapted to communicate with said circuit.

According to another embodiment, said receptor device comprises a verification block adapted to generate an alert if the execution time of said cryptographic operation exceeds a time limit.

According to another embodiment, said receptor is at least one of: a set-top box; a device adapted to permit a user to physically access to a restricted area; a device adapted to permit a user to access a restricted area of an internet site.

BRIEF DESCRIPTION OF THE DRAWINGS

The foregoing and other purposes, features, aspects and advantages of embodiments will become apparent from the following detailed description, given by way of illustration and not limitation with reference to the accompanying drawings, in which.

DETAILED DESCRIPTION

Only those aspects useful for an understanding of embodiments will be represented in the drawings and described in detail in the following description. Other aspects, such as the particular applications of the cryptographic circuitry and method will not be described in detail, embodiments being applicable to a wide range of applications, including IC cards and other security applications.

Figure 1:
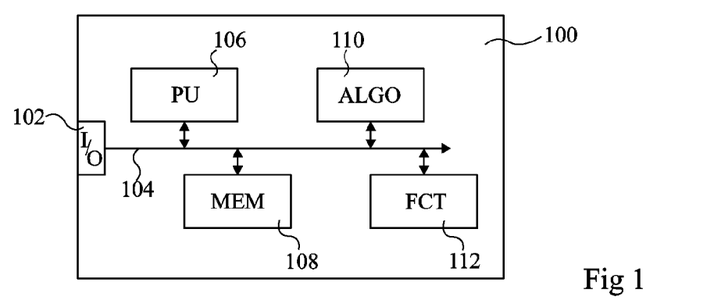
FIG. 1 illustrates a cryptographic access device according to an embodiment.

FIG. 1 illustrates a cryptographic access device 100, which is for example a smart card, or other type of integrated circuit card comprising a chip that implements a cryptographic operation.

The device 100 comprises an input/output port (I/O) 102, which, for example, contains a suitable interface for communicating with a receptor device (not shown in FIG. 1), which could for example be a set-top box, or other terminal capable of communications with the device 100.

The input/output port 102 is coupled to a bus 104 of the device 100, via which access is provided to a processing unit (PU) 106, a memory (MEM) 108, and an algorithm block (ALGO) 110, which implements a cryptographic algorithm in hardware. The cryptographic algorithm may make use of a cryptographic key, which should remain secret, and is for example stored in a protected memory on chip. Optionally, the bus 104 is also coupled to a function block 112, which for example implements other functions of the device 100 depending on the particular application.

As described above, those wishing to fraudulently gain access to the services, information, a restricted area or other benefits provided by the access card may produce a software emulation of the hardware that implements the complete chip, including the cryptographic algorithm of block 110. However, according to the embodiments described herein, this can be made difficult, as will now be described with reference to FIG. 2.

Figure 2:
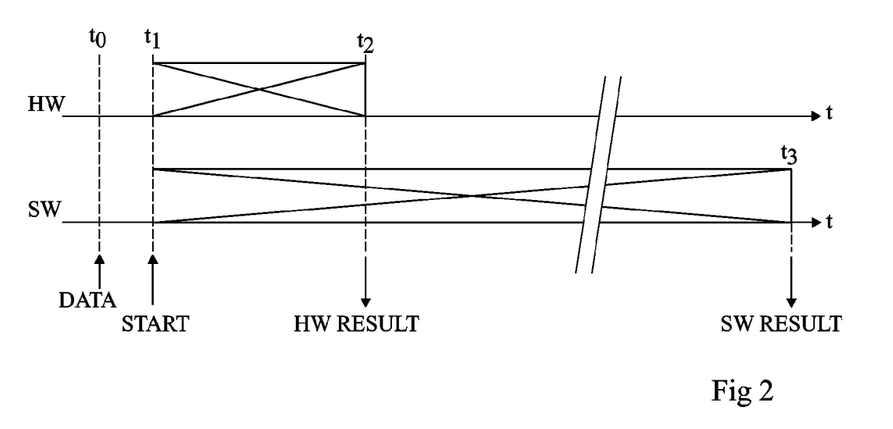
FIG. 2 is a timing diagram illustrating a principle behind a cryptographic operation according to embodiments.

FIG. 2 shows timing diagrams illustrating an example of the runtimes of the hardware implementation of the cryptographic algorithm of block 110 of FIG. 1, and of its software emulation.

It is assumed that the cryptographic algorithm is to be performed on data received at the input/output port 102 at a time t0, and that the algorithm starts processing this data a short time later, at a time t1. At a time t2, the result of the cryptographic operation is made available by the hardware implementation. For example, the delay between t1 and t2 is in the region of a few tens of milliseconds.

It is also assumed that the software emulation of the cryptographic function also starts processing the input data at time t1. However, the result of the software emulation is available at a time t3, which is a significant time delay after the time t2. For example, the delay between t1 and t3 is at least twice the delay between t1 and t2, or even as high as ten times or greater, and could be in the region of hundreds of milliseconds or a few seconds.

According to the embodiments described herein, the cryptographic algorithm is designed in such a way that its implementation in software is far less efficient than the hardware implementation. This is achieved at least in part by the use of a cryptographic primitive that operates on a state comprising non-binary digits rather than bytes or bit-strings. The term non-binary digit is used to denote any symbol that has a range of r values that is not a power of two. For example, symbols in the range [0 . . . 6] have 7 possible values, and will be referred to herein as digits of base 7. An operation performed to the base r will be referred to herein as a "modulo r" or "(mod r)" calculation. Examples of such modulo r operations include modular addition, taking the additive modular inverse, modular multiplication and taking the modular multiplicative inverse.

Furthermore, the cryptographic primitive for example comprises a non-uniform operation performed on the non-binary digits, such as a non-uniform arithmetic operation. The term non-uniform is used herein to designate an operation in which each digit of a state is treated differently, for example by functions that are qualitatively different from each other. For example, the values of digits of the state are updated based on the old values according to a modular arithmetic function that differs qualitatively from digit to digit. In other words, a different modulo r function is applied to each digit, one function for example being a modulo r addition, another being a modulo r multiplication, etc.

As will be described in more detail below, the increased time delay of the software emulation can render, in certain applications, the use of the software emulation impossible.

Figure 3A:
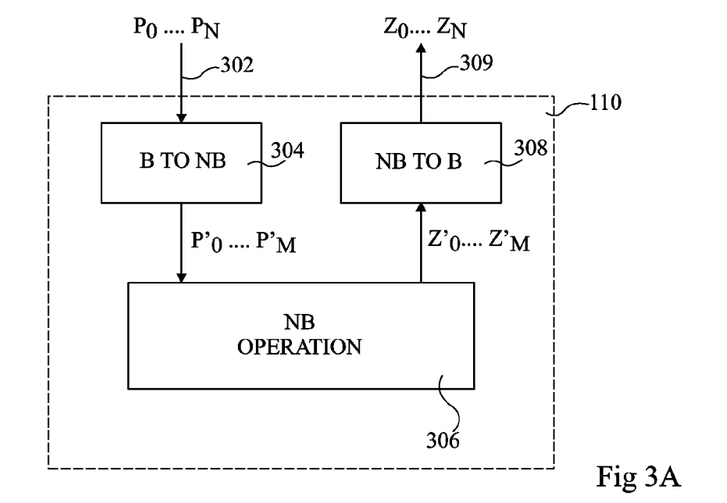
FIG. 3A schematically illustrates a hardware implementation of a cryptographic operation according to an embodiment.

FIG. 3A schematically illustrates an embodiment of the hardware of the algorithm block 110 of FIG. 1 in more detail.

The cryptographic operation implemented by block 110 is for example any cryptographic primitive that does not use the implementation of an inverse mapping for its operation. For example, the operation comprises stream ciphers, hash functions, in particular compression functions of a hash function, and/or block ciphers, used in modes that do not use the inverse cipher. For example, the modes of the operation could be the output feedback mode, counter mode, or modes used for message authentication (MAC). As will be described herein, the operation could also comprise an iterated permutation or the sponge function.

Block 110 comprises an input 302 comprising one or more lines for receiving, in parallel or in serial, input data values P0 to PN, which could represent: message data prior to being subject to a MAC computation, hash computation or authenticated encryption; encrypted data and data to be authenticated; one or more cryptographic keys; or other data for use during a cryptographic operation. Each input data value P0 to PN for example comprises a single bit or a plurality of bits, such as a word of 8, 16 or 32 bits.

The cryptographic operations to be performed by algorithm block 110 are based on a state comprising an array of non-binary digits. This for example involves injecting the input data and/or a key into the state of the cryptographic primitive. Given that the input data values P0 to PN are in the form of a sequence of binary bits or bytes, a transformation of the input data is first performed, which involves splitting the binary data bits into groups of bits, referred to herein as tuples of bits. Each tuple of bits is interpreted as an integer. The number of bits z forming each tuple is chosen such that $2^z$ is smaller than the number of possible values of the digit, in other words it is smaller than the base r.

Thus, the input data values P0 to PN are provided to a binary to non-binary block (B TO NB) 304, which provides M+1 data digits P0' to PM', by splitting the data values P0 to PN into tuples of bits.

The base r of the data values P0' to PM' is an integer greater than 2 and not equal to a power of 2. For example, r is an odd integer greater than 1. In another example, r is a prime number greater than 2. Assuming that each digit is represented by a plurality of bits, there will always be some redundancy in this representation. Advantageously, this redundancy can be minimized by choosing r equal to $2^n-1$, for integer values of n greater than 1. For example, r is equal to 3, 7 or 15.

The base-r digits P0' to PM' are provided to a base-r cryptographic block (CRYPTO BLOCK) 306, which performs a non-binary operation on each of the digits. In particular, block 306 for example performs a sequence of operations, such as additions, subtractions and/or multiplications, modulo the base r. For example, the operation comprises an iterative round function performed on a state of non-binary digits. For example, the cryptographic operation is an iterative execution of a round function performed on a state of non-binary state digits, each execution of the round function being based on one or more of the plurality of non-binary digits. For example the operation comprises a number of iterations of a round function comprising non-linear operations such as modular multiplications among the state digits, mixing operations, i.e. modular additions among neighboring state digits, and transpositions, i.e. moving the state digits around. Alternatively or additionally, block 306 for example comprises table lookups. The block for example comprises a base-r cryptographic primitive or module, into which data and/or keys are injected, and from which blocks of bits are extracted. Each of the binary digits is for example applied to a corresponding state value, for example by addition or multiplication, and thus each digit is treated in a different way, leading to a non-uniform implementation.

The output of the cryptographic block 306 is provided in the form of base-r digits Z0' to ZM', which are provided to a binary extraction block (NB to B) 308, which extracts binary values from the non-binary base-r digits, to generate output binary data values Z0 to ZN on one or more lines 309. In particular, block 308 extracts a block of N blocks of bits from M base-r digits. The use of the output bits will depend on the particular application. For example, in the case of data encryption, the input values P0 to PN for example correspond to the encryption key, and output values Z0 to ZN are added to a message data stream.

While a binary operation can be performed relatively quickly in hardware or software, a non-uniform operation of base-r can be relatively quick to perform in hardware, but very slow to perform in software. Indeed, standard software processors are not adapted to perform non-binary operations, and thus require specific programming. Furthermore, due to the non-uniformity among the operations performed on each of the non-binary digits, techniques for using parallelism, such as bit-slice techniques, can not be utilized to speed up the software implementation, leading to a serial implementation, which can be very slow.

Furthermore, in some embodiments, protection against fault attacks may be provided based on the use of base-r digits, where r is not equal to a power of 2. Indeed, each non-binary digit is for example represented by a plurality of bits. As an example, for non-binary digits of base 3, the bits "00" represent the value 0, the bits "01" represent the value 1 and the bits "10" represent the value 2. In this case, the bit combination "11" would never occur, and thus the occurrence of this combination would indicate the presence of a fault.

Figure 3B:
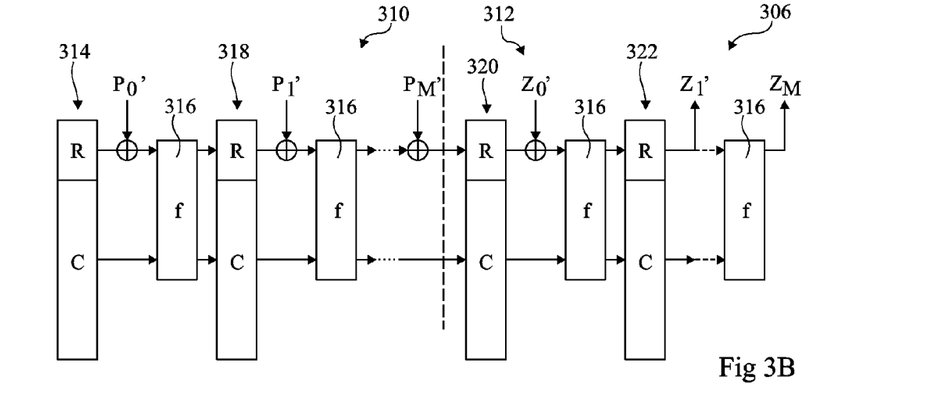
FIG. 3B schematically represents the operation of part of the hardware of FIG. 3A in more detail according to an embodiment.

FIG. 3B schematically represents the operation of the non-binary operation block 306 of FIG. 3A according to one particular example in which the operation is a sponge function, comprising an absorbing portion 310, and a squeezing portion 312. Sponge functions are for example described in more detail in the publication entitled "Sponge functions", by G. Bertoni et al.

An initial state 314 comprises R digits forming a first group and C digits forming a second group. An iterative operation is then performed, in which a first of the data values P0' is added to the R digits of the initial state 314, and the resulting value, along with the C digits of the initial state, are provided to a function block 316. The function block 316 performs a function on the data values, for example a permutation among the groups of R and C digits, including at least one permutation between the groups. The output of the function block 316 provides a new state 318, having groups of modified R and C digits.

This process is then repeated in a subsequent iteration in which the next data value P1' is added to the R digits of state 318 and again the function of block 316 is applied. The iterations continue until all the input digits P0' to PM' have been absorbed, which will be after M+1 iterations.

In the squeezing phase 312, the final state resulting from the absorbing phase 310 forms the initial state 320. The R digits of this initial state 320 are extracted as a first output data value Z0'. Furthermore, the R and C groups of digits are provided to the function block 316, which performs the same function on these digits as during the absorbing phase. This process is iteratively repeated to extract the next data value Z1', and then again until the final output data value ZM' has been extracted after M+1 iterations.

Figure 4:
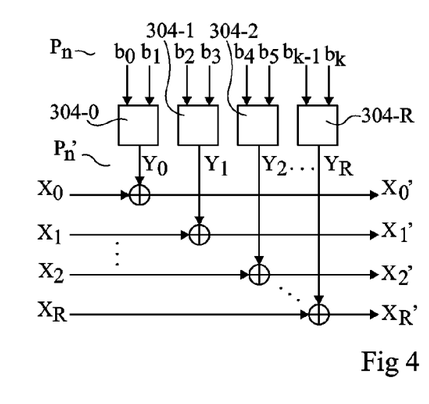
FIG. 4 schematically illustrates circuitry for converting binary data bits into non-binary digits according to an embodiment.

FIG. 4 illustrates an example implementation of the binary to non-binary conversion and the addition of the non-binary digits of the digits P0' to PM' to the R digits of the state.

It is assumed that each data value Pn, for integer values of n between 0 and N, comprises binary bits b0 to bk. Furthermore, it is assumed in the example of FIG. 4 that the base is 7, in other words that each digit is in base 7.

The bits b0 to bk are split into pairs by corresponding sub-blocks 304-0 to 304-R of the block 304, to provide corresponding digits Y0 to YR of the digits P0' to PM' in base 7. Thus the digits Y0 to YR each have a number value of 0, 1, 2 or 3, and each is represented by three bits. Each of these values Y0 to YR is added, modulo 7, to a corresponding digit X0 to XR of the state, also represented by three bits, to provide the modified digits X0' to XR' of base 7, which are provided to the function block 316. Thus, the number R of digits is for example equal to half the number k+1 of input bits.

Figure 5:
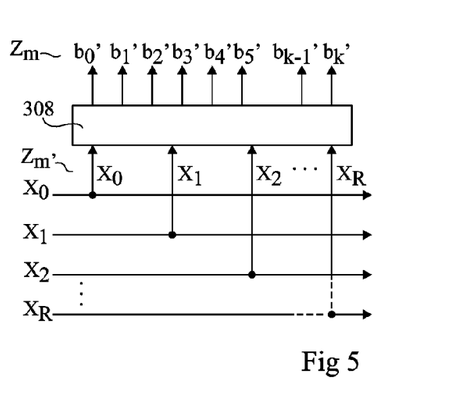
FIG. 5 schematically illustrates circuitry for extracting binary data bits from non-binary digits according to an embodiment.

FIG. 5 illustrates the extraction, from the R digits of a current state, of a binary data value Zm, for integer values of m between 0 and M. As illustrated, each of the digits X0 to XR of the current state is provided to the extraction block 308. Each digit X0 to XR is for example represented by three bits, and block 308 perform a logic operation on these bits to generate the binary values b0' to bk' of the output data value Zm.

One option would be to simply take the binary values of the internal representation of each base-r digit. However, one or more bit combinations never occur, such as the bits "111" in the example of base 7 digits, and thus there will be an imbalance. It will be apparent to those skilled in the art that the techniques also used for generating error detecting codes can be used to reduce this imbalance. For example, according to such techniques, the number of output bits is much lower than the number of input bits, and for example the sum (mod 2) of any combination of output bits is equal to the sum (mod 2) of at least z input bits, where z is greater than 2 and for example equal to 10 or more. Thus, if the imbalance of the input bits is x, the imbalance of the output bits is xz.

Thus, according to one example, each of the output bits $b_0'$ to $b_k'$ is generated based on an XOR function applied to a selected plurality of the bits of said non-binary digits $X_0$ to $X_R$. For example, the selection for the k+1 output bits of the output value $Z_m$ based on z input bits of the input value $Z_m'$ is calculated as $Z_m = M Z_m'$, where $Z_m$ and $Z_m'$ are binary column vectors and M is a binary matrix. Each column of the matrix M for example has a hamming weight of an integer z equal to or greater than two, and for example equal to more than 20.

In the embodiments described above, the non-binary digits are represented by the equivalent number in binary. For example, the digit 6 in base 7 is represented by three bits "110". This need not be the case, as the choice of the particular bit combination representing each non-binary digit is arbitrary. However, whatever the representation, there will be some redundancy, as not all of the possible binary combinations will be used. The remaining combinations of the binary bits can be used to provide additional protection of the circuit against fault injection, as will now be described with reference to FIG. 6.

Figure 6:
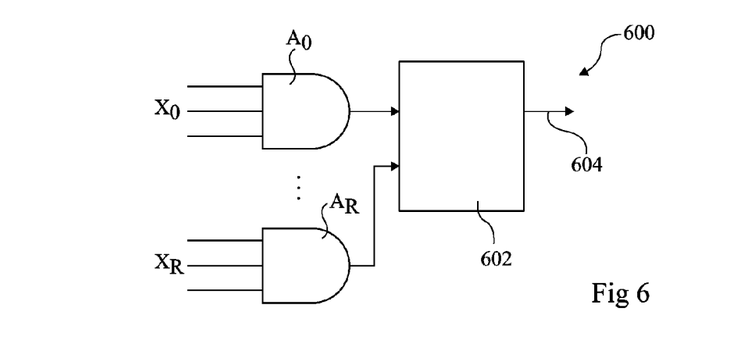
FIG. 6 illustrates verification circuitry for detecting an attack according to an embodiment.

FIG. 6 illustrates verification circuitry 600 comprising AND gates A0 to AR, which respectively receive the bits representing each digit X0 to XR. In the example of FIG. 6, the digits are of base 7, each represented by three bits, and the value "111", which would represent the integer 7, is not used. Thus the presence of the bits "111" would indicate a fault, which can be detected by a block 602. In particular, block 602 receives the output of each of the AND gates A0 to AR, and generates an alert on a line 604 signaling the occurrence of a fault in one or more of the digits if the output of any of the AND gates goes high. For example, block 602 could simply be an OR gate, that outputs a "1" if there is at least one fault. In some embodiments, the block 602 comprises a counter, which triggers the alert on line 604 after a certain number of faults have been detected. The alert on line 604 for example resets the chip, or renders the chip temporarily or permanently disabled.

The verification circuit 600 could for example be provided to test the digits of the current state of FIG. 3B before or after each operation implemented by the function block 306.

Figure 7:
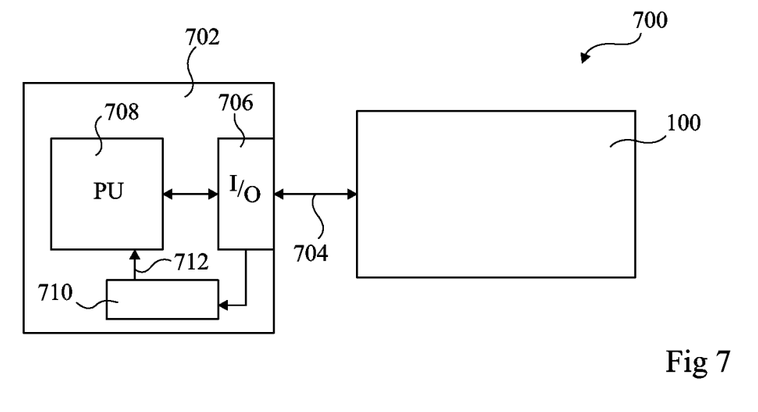
FIG. 7 illustrates a cryptographic access system according to embodiments.

FIG. 7 illustrates a cryptographic access system 700, comprising a receptor 702 that communicates, via an interface 704, with the cryptographic access device 100 of FIG. 1 described above. The interface between the receptor device 702 and the access device 100 may be any one of various interface types, such as a physical contact between connection pads on the device 100 with pins of the receptor device 702 (pads and pins not shown in FIG. 7), or by a wireless interface, such as by RF communication.

The receptor device 702 is for example a set-top box, such as a satellite, ADSL, or cable television decoder, a device adapted to permit a user to physically access to a restricted area, such as an entry gate system, or ticket gate of a travel network, a device adapted to permit a user to access a restricted area of an internet site, etc.

The receptor device 702 comprises an input/output port 706, and a processing unit 708 that communicates with port 706. Furthermore, a time lapse detection block 710 is provided for verifying that the response time of the device 100 is not slow, which would indicate that it is a software emulation. For example, block 710 receives a first signal indicating the time t0 of FIG. 2 when the data is provided by port 706 to the access device 100, and a second signal indicating the time t2 or t3 indicating when the result is returned from the device 100 to port 706. Block 710 verifies whether the delay time between these first and second signals exceeds a time limit. For example, the time limit is set at twice the normal delay time of the hardware implemented device 100. If the time limit is exceeded, an alert is generated on a line 712 to the processor 708, indicating that a software emulation is being used. The alert for example resets the processor 708, or temporarily deactivates it. Alternatively, block 710 may comprise a counter that generates the alert on line 712 if the time limit has been exceeded a certain number of times.

Alternatively, rather than providing the detection block 710, the additional time delay imposed by emulating the cryptographic operation in software could make operation of authentication mechanism of the device 100 prohibitively slow for the particular application implemented by receptor 702. For example, the receptor device 702 could be a video decoder that performs an authentication operation using device 100 for each video frame of a video stream, or for regular frames thereof. The response delay by device 100 if emulated in software may be sufficiently slow that successfully viewing of the video is not possible.

An advantage of the embodiments described herein is that the execution of cryptographic operation can be made to be relatively fast in hardware, but relatively slow in software, in a relatively simple fashion.

Furthermore, the so-called T-table implementation of a round function of a cryptographic primitive can be hindered in software by performing an operation of modulo r, where r is an integer greater than 2 and not equal to a power of 2. In particular, a T-table implementation of the AES (advanced encryption standard) involves implementing a round function by a series of table lookups and bitwise XOR operations. However, by using a modulo r operation, the XOR modulo 2 is replaced by a more complex modulo r operation, which can not be readily implemented by a CPU.

Furthermore, by using a non-uniform function, a software implementation can be made even harder. An example of a non-uniform iterative function, in other words a non-uniform function that applies a different modulo r operation to each state digit, for example with r=3, would be:

$$C\_i = K00\_i + K10\_i * A\_i + K01\_i * B\_i + K11\_i * A\_i * B\_i$$

where Kxy_i are constants that vary with the index i, and A_i and B_i are state digits. In this example, in hardware, the constant Kxy_i can be hardwired in combinatorial logic for each index i, while in software a bitslice implementation would use the evaluation of this expression taking as inputs 12 words, one word representing the most significant and least significant bits of each of the six values A_i, B_i, Kxy_i. Furthermore, as the value of the modulo r increases, the number of constants also increases, leading to a less efficient bitslice operation.

Furthermore, by transforming input and output data values from binary to non-binary format and back to binary again, the fact that the cryptographic operation is performed in non-binary can be transparent to the surrounding circuitry, such as the receptor device.

Having thus described at least one illustrative embodiment of the invention, various alterations, modifications and improvements will readily occur to those skilled in the art.

For example, while embodiments have been described in which the cryptographic access device 100 is an IC card or the like, in alternative embodiments, the device 100 could be any electronic device, including by not limited to a mobile telephone, laptop computer, or other mobile device.

Furthermore, it will be apparent to those skilled in the art that the particular cryptographic algorithm implemented by the algorithm block 110 of the cryptographic access device 100 may be adapted to the particular application.

Furthermore, while in some applications of the embodiments described herein the processing time of the cryptographic can be used to detect the use of an emulation of the cryptographic device, the processing time may also be used to identify a genuine product, thereby providing brand protection.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method, comprising:
receiving a plurality of binary input values;
performing, using cryptographic circuitry of a computing system, a cryptographic operation on the plurality of binary input values, the performing the cryptographic operation including:
transforming said plurality of binary input values into a plurality of non-binary input digits of base r, where r is an integer greater than 2 and not equal to a power of 2, and wherein the plurality of non-binary input digits comprises a first non-binary input digit and a second non-binary input digit, each non-binary digit being represented by a plurality of bits with some redundancy; and
performing a modulo r operation on each of the plurality of non-binary input digits to generate at least one output digit of base r, by performing a first modulo r operation on the first non-binary input digit and a second modulo r operation on the second non-binary input digit, the second modulo r operation being qualitatively different from the first modulo r operation; and
extracting from said at least one output digit of base r a plurality of binary output values, wherein extracting the plurality of binary output values comprises performing imbalance correction.

2. The method of claim 1 wherein performing said imbalance correction comprises generating each binary output value based on an XOR operation applied to at least two bits of a binary representation of said at least one output digit to reduce an imbalance due to unused bit combinations of the plurality of binary values.

3. The method of claim 1, wherein the first modulo r operation comprises a modular addition, subtraction and/or multiplication of the first non-binary input digit of the plurality of non-binary input digits with the second non-binary input digit of the plurality of non-binary input digits, and/or comprises taking a modular additive or multiplicative inverse of the first non-binary input digit.

4. The method of claim 1, wherein r is a prime number not equal to 2.

5. The method of claim 1, wherein r is equal to $2^n - 1$, where n is an integer equal to or greater than 2.

6. The method of claim 1, further comprising generating an alert signal if an execution time of said cryptographic operation exceeds a set time limit.

7. The method of claim 1, wherein said cryptographic operation comprises an iterative execution of a round function performed on a state of non-binary state digits, each execution of said round function being based on one or more of said plurality of non-binary input digits.

8. The method of claim 7, wherein the iterative round function of said cryptographic operation comprises the modulo r operation applied to each digit of said state, wherein the modulo r operation applied to each digit is different from the modulo r operation applied to every other digit.

9. The method of claim 1, wherein said cryptographic operation comprises one of:
a sponge function;
a stream cipher;
a compression function of a hash function;
an iterated permutation;
a block cipher; or
a message authentication operation.

10. The method of claim 1, further comprising generating an alert if said plurality of input digits has a combination that does not represent a digit of base r.

11. The method of claim 1, wherein an execution time of a software implementation of the modulo r operations is longer than an execution time of the modulo r operations by the cryptographic circuitry.

12. A device, comprising:
transforming circuitry, which, in operation, transforms a plurality of binary input data values into a plurality of non-binary input digits of base r, where r is an integer greater than 2 and not equal to a power of 2, and wherein the plurality of non-binary input digits comprises a first non-binary input digit and a second non-binary input digit, each non-binary digit being represented by a plurality of bits with some redundancy;
cryptographic circuitry, which, in operation, performs, on each of the plurality of non-binary input digits, a modulo r operation to generate at least one output digit of base r, wherein a first modulo r operation is performed on the first non-binary input digit and a second modulo r operation is performed on the second non-binary input digit, the second modulo r operation being qualitatively different from the first modulo r operation; and extracting circuitry, which, in operation, extracts, from said at least one output digit of base r, a plurality of binary output values, wherein said extracting circuitry extracts the plurality of binary output values at least in part by performing imbalance correction.

13. The device of claim 12 wherein said extracting circuitry performs said imbalance correction by generating each binary output value based on an XOR operation applied to at least two bits of a binary representation of said at least one output digit.

14. The device of claim 12, wherein said cryptographic circuitry performs an iterative execution of a round function performed on a state of non-binary state digits, each execution of said round function being based on one or more of said plurality of non-binary input digits.

15. The device of claim 14, wherein the iterative round function comprises the modulo r operation applied to each digit of said state, wherein the modulo r operation applied to each digit is different from the modulo r operation applied to every other digit.

16. The device of claim 12, comprising an IC card including at least the cryptographic circuitry.

17. The device of claim 12, comprising receptor circuit, which, in operation, communicates with said cryptographic circuit.

18. The device of claim 17 wherein said receptor circuit comprises verification circuitry, which, in operation, generates an alert if an execution time of said cryptographic operation exceeds a time limit.

19. The device of claim 18, wherein said receptor circuit includes at least one of:
set-top box circuitry;
access control circuitry, which, in operation, selectively permits a user to physically access a restricted area; and
access control circuitry, which, in operation, selectively permits a user to access a restricted area of an internet site.

20. A method, comprising:
performing, using cryptographic circuitry of a computing system, an operation on a plurality of binary input values to generate at least one non-binary output digit of base r, the performing the operation including:
converting the plurality of binary values into a plurality of non-binary input digits of base r, where r is an integer greater than 2 and not equal to a power of 2 and each non-binary digit is represented by a plurality of bits with some redundancy;
performing a first modulo r operation on at least one first non-binary input digit of the plurality of non-binary input digits of base r; and
performing a second modulo r operation on at least one second non-binary input digit of the plurality of non-binary input digits of base r, wherein an output of the second modulo r operation is dependent upon an output of the first modulo r operation; and
extracting from said at least one output digit of base r a plurality of binary output values, wherein extracting the plurality of binary output values comprises performing imbalance correction based on one or more invalid bit combinations of the plurality of binary output values.

21. The method of claim 20, wherein the output of the first modulo r operation comprises at least one non-binary intermediate digit of base r, and wherein the second modulo r operation is performed on the at least one non-binary intermediate digit and the at least one second non-binary input digit.

22. The method of claim 20, further comprising generating an alert signal if an execution time of performing said cryptographic operation exceeds a time limit.

23. A device, comprising:
a binary-to-non-binary conversion circuit, which, in operation, converts a plurality of binary values into a plurality of non-binary input digits of base r, where r is an integer greater than 2 and not equal to a power of 2 and each non-binary digit is represented by a plurality of bits with some redundancy;
means for performing a cryptographic operation on the plurality of non-binary input digits of base r to generate at least one non-binary output digit of base r, the cryptographic operation comprising:
a first modulo r operation performed on at least one first non-binary input digit of the plurality of non-binary input digits of base r; and
a second modulo r operation performed on at least one second non-binary input digit of the plurality of non-binary input digits of base r, wherein an output of the second modulo r operation is dependent upon an output of the first modulo r operation; and
means for extracting, from said at least one output digit of base r, a plurality of binary output values, wherein extracting the plurality of binary output values includes performing imbalance correction based on one or more invalid bit combinations of the plurality of binary output values.

24. The device of claim 23, wherein the output of the first modulo r operation comprises at least one non-binary intermediate digit of base r, and wherein the second modulo r operation is performed on the at least one non-binary intermediate digit and the at least one second non-binary input digit.

25. The device of claim 23, further comprising means for generating an alert signal if an execution time of performing said cryptographic operation exceeds a time limit.

26. A device, comprising:
a binary-to-non-binary conversion circuit, which, in operation, converts a plurality of binary values into a plurality of non-binary input digits of base r, where r is an integer greater than 2 and not equal to a power of 2 and each non-binary digit is represented by a plurality of bits with some redundancy;
a cryptographic circuit, which, in operation, performs a cryptographic operation on the plurality of non-binary input digits of base r to generate at least one non-binary output digit of base r, the cryptographic operation comprising:
a first modulo r operation performed on at least one first non-binary input digit of the plurality of non-binary input digits of base r; and
a second modulo r operation performed on at least one second non-binary input digit of the plurality of non-binary input digits of base r, wherein an output of the second modulo r operation is dependent upon an output of the first modulo r operation; and
an extraction circuit, which, in operation, extracts, from said at least one output digit of base r, a plurality of binary output values, wherein said extracting circuitry extracts the plurality of binary output values at least in part by performing imbalance correction.

27. The device of claim 26 wherein the output of the first modulo r operation comprises at least one non-binary intermediate digit of base r, and wherein the second modulo r operation is performed on the at least one non-binary intermediate digit and the at least one second non-binary input digit.

28. The device of claim 26, further comprising a time lapse detection circuit, which, in operation, generates an alert signal if an execution time of performing said cryptographic operation exceeds a time limit.

29. The method of claim 1, wherein for every pair of third and fourth digits in the plurality of non-binary input digits, the modulo r operation performed on the third digit is qualitatively different from the modulo r operation performed on the fourth digit.

30. The device of claim 12, wherein for every pair of third and fourth digits in the plurality of non-binary input digits, the modulo r operation performed on the third digit is qualitatively different from the modulo r operation performed on the fourth digit.

31. The device of claim 12 wherein a first type of modulo r operation is performed on the first non-binary input digit and a second type of modulo r operation is performed on the second non-binary input digit, the second type of modulo r operation being different from the first type of modulo r operation.

32. The method of claim 1 wherein a first type of modulo r operation is performed on the first non-binary input digit and a second type of modulo r operation is performed on the second non-binary input digit, the second type of modulo r operation being different from the first type of modulo r operation.

33. The method of claim 1 wherein the computing system comprises a video decoder.

34. The device of claim 26, comprising video decoding circuitry coupled to the extraction circuit, wherein the video decoding circuitry, in operation, receives the plurality of binary output values.

* * * * *